United States Patent [19]

Thomas

[11] 4,140,874
[45] Feb. 20, 1979

[54] AUTOMATIC COMPENSATING CIRCUIT
[75] Inventor: Dale C. Thomas, Ontario, N.Y.
[73] Assignee: Xerox Corporation, Stamford, Conn.
[21] Appl. No.: 536,706
[22] Filed: Dec. 26, 1974
[51] Int. Cl.² .................... H04B 17/00; H04L 25/06
[52] U.S. Cl. ................................. 178/88; 328/115;
                                            328/162; 307/231
[58] Field of Search ............. 325/319, 400, 392, 397,
        325/407, 408, 410, 411, 399; 178/88; 333/16,
                    17; 330/52; 328/115; 340/347 CC

[56] References Cited
U.S. PATENT DOCUMENTS

| | | | |
|---|---|---|---|
| 3,374,479 | 3/1968 | Moore | 325/400 X |
| 3,470,480 | 9/1969 | Smart et al. | 325/400 |
| 3,634,770 | 1/1972 | Spreitzhofer | 328/115 |
| 3,754,232 | 8/1973 | Gut et al. | 340/347 CC |
| 3,772,604 | 11/1973 | Hogg et al. | 328/169 |
| 3,810,157 | 5/1974 | Kallio | 340/347 DA |

*Primary Examiner*—Benedict V. Safourek
*Assistant Examiner*—Michael A. Masinick

[57] ABSTRACT

Circuitry for establishing a variable voltage reference for a circuit which amplifies and shifts an input signal. When a known input signal is applied to the circuitry, a counter is incremented to increase in a stepped fashion the variable voltage until the circuit output reaches a region of tolerance around a desired set point. The counter is then stopped and remains in that state, holding the variable voltage reference at its last value.

9 Claims, 3 Drawing Figures

AUTOMATIC COMPENSATING CIRCUIT

BACKGROUND OF THE INVENTION

This invention relates to compensation circuitry in electrical signal sensing apparatus and, more particularly, to automatic compensation circuitry operative at the start of transmission of information in a communications system.

In data communications systems, and particularly facsimile communications systems, information to be transmitted from a sending terminal to a receiving terminal typically modulates a carrier signal of fixed frequency, either by amplitude modulation techniques or by frequency modulation techniques. At the receiving end of the communications channel, the signal is demodulated into a form usable by the receiving terminal. In order to faithfully reproduce at the receiving end the information transmitted over the communications channel, it is necessary for the demodulation circuitry in the receiver to have some fixed reference point. Because of inherent component value drifting due to aging and temperature variations, it is necessary to provide some means for adjusting the reference point to compensate for this drifting. To avoid the necessity of human intervention in the operation of the apparatus, it would be desirable to provide some means for the automatic adjustment of the reference point to compensate for component value drifting.

SUMMARY OF THE INVENTION

In accordance with principles illustrative of this invention, circuitry is provided for automatic drift compensation. In a facsimile transmission system, it is known that at the start of transmission, a carrier signal will be detected. The demodulation circuitry is required to provide a specified output signal in response to a detected signal at the carrier frequency. The inventive circuitry includes a digital to analog converter which provides a variable voltage reference for an operational amplifier whose function is to shift and amplify an incoming demodulated signal. When a signal at the carrier frequency is detected at the start of transmission, the circuitry is activated to ensure that the output of the operational amplifier is at a predetermined level. In more detail, a counter is incremented to control a digital to analog converter to stepwise increase a variable voltage reference for the amplifier until the output of the amplifier reaches the predetermined level. The counter is then stopped and remains in that state for the duration of the transmission.

DESCRIPTION OF THE DRAWING

The foregoing will become more readily apparent upon reading the following description in conjunction with the drawing in which.

DESCRIPTION OF THE EXEMPLARY EMBODIMENT

Figure 1:
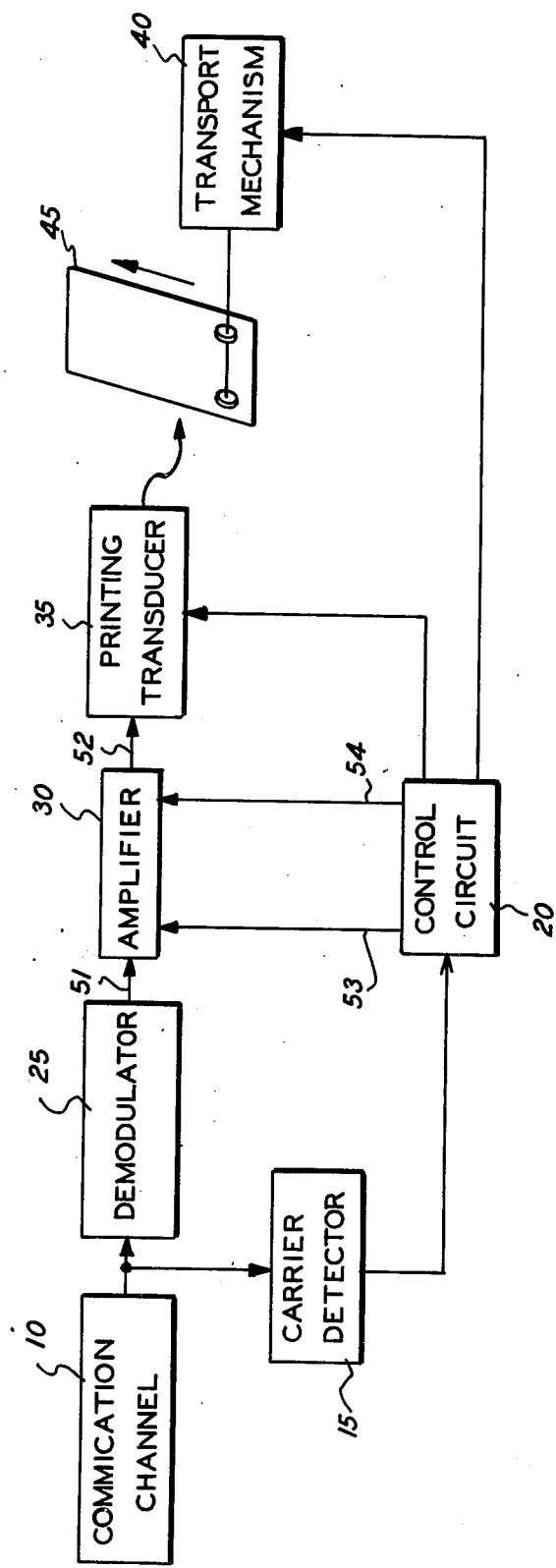
FIG. 1 is an illustrative simplified schematic diagram of a facsimile receiver in which the principles of this invention may be incorporated.

Turning now to the drawing, depicted in FIG. 1 is a simplified schematic representation of an illustrative facsimile receiver in which may be incorporated circuitry operating in accordance with the principles of this invention. Such a transmitter is disclosed, for example, in U.S. Pat. No. 3,869,569, which issued Mar. 3, 1975, the disclosure of which is hereby incorporated by reference. As shown in FIG. 1, the illustrative facsimile receiver is coupled to a communication channel 10 over which signals are received from a remote transmitter. These signals illustratively take the form of a carrier frequency signal which is frequency modulated by information and/or control signals. Carrier detect circuit 15, which is illustratively of the type disclosed in U.S. Pat. No. 3,593,151, monitors the signal from communication channel 10 and generates a control signal for control circuit 20 when the carrier signal is detected in order to initiate operation of the facsimile receiver. Demodulator 25 converts the frequency signals received from communication channel 10 into voltage signals and applies these voltage signals to amplifier 30, which functions to shift and amplify the demodulated signal for application to printing transducer 35. Printing transducer 35 in cooperation with transport mechanism 40 converts the electrical signal at its input into an image on recording medium 45. Recording may be done in any of several different ways. As disclosed in the above-referenced U.S. Pat. No. 3,869,569, printing transducer 35 may be a laser and recording medium 45 a xerographic processor. Alternatively, printing transducer 35 may be an impact mechanism and recording medium 45 may be a pressure sensitive paper, such as that used in the Telecopier III facsimile transceiver manufactured by Xerox Corporation. As a further alternative, printing transducer 35 may be an electric stylus and recording medium 45 may be electroresistive paper, such as that utilized in the 400 Telecopier facsimile transceiver manufactured by Xerox Corporation. In any of these cases, control circuit 20 functions to coordinate the operation of the various subassemblies. Control circuit 20 forms no part of the present invention and any suitable control circuit may be utilized.

In the illustrative system, amplifier 30 must have a reference voltage in order to properly shift and amplify the incoming signal to provide an output signal to printing transducer 35 which represents the information to be recorded on medium 45. If a fixed reference voltage were supplied, component drift due to age and temperature would cause the output of amplifier 30 to shift, thereby causing image degradation.

It is known that at the start of a facsimile transmission, a carrier signal is sent over the communication channel. It is also known that this carrier signal should result in a predetermined output from amplifier 30. Therefore, in accordance with the principles of this invention, each time a transmission is initiated and a carrier signal is detected, the aforementioned reference voltage is adjusted so that component drifting due to temperature variations and age are eliminated.

Figure 2:
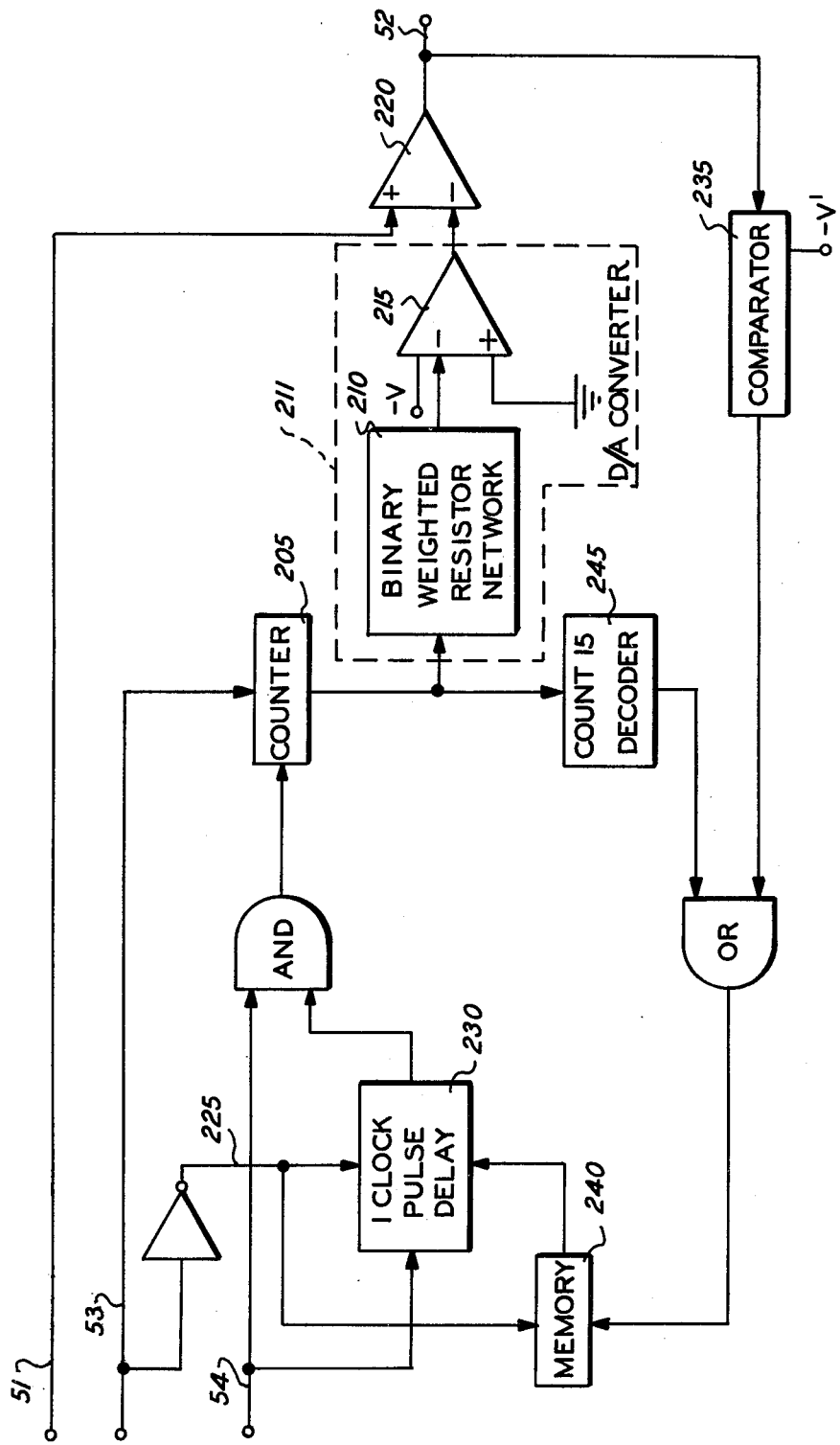
FIG. 2 is a block diagram of circuitry constructed in accordance with the principles of this invention.

Depicted in FIG. 2 is a block diagram of circuitry to perform the above-described function. Illustratively, the signal on lead 51 into amplifier 30 varies in the range from +2.6 to +8.0 volts. The function of amplifier 30 is to convert that signal into a signal on lead 52 which varies from −8.5 to +8.5 volts, respectively. The carrier frequency signal results in a signal on line 51 of +5.3 volts. That is to be converted to zero volts on line 52. On line 53 is a logic signal which is at a high logic ("ONE") level prior to detection of a carrier signal. This logic signal goes to a low logic ("ZERO") level when a carrier signal is detected. On line 54 is a clock signal.

Prior to carrier being detected, the ONE level signal on line 53 causes counter 205 to be reset. When counter 205 is reset, this causes D/A converter 211 to provide a reference voltage to amplifier 220 that causes the output of amplifier 220 on lead 52 to be at a negative level. When the carrier signal is detected, the signal on lead 53 goes to a ZERO level, thereby enabling counter 205 and imparting a high logic level signal to lead 225. The high logic level on lead 225 enables a delay circuit 230 which senses the first clock pulse after the signal on lead 53 goes low and does not allow this clock pulse to reach counter 205. However, all succeeding clock pulses are allowed to increment counter 205, and for every increment in count, the voltage on line 52 is increased by 150 millivolts. The voltage on lead 52 is compared, in comparator 235, to a reference voltage −V', which for illustrative purposes is one half the step size of the increments on lead 52, i.e., −75 millivolts. As soon as the voltage on lead 52 becomes more positive than −V', the comparator output changes state, setting memory 240, which inhibits any more clock pulses from incrementing counter 205. Counter 205 retains its present state for the duration of the transmission, thereby setting up a constant reference voltage for amplifier 220.

Counter 205 is illustratively a 4-bit binary counter which counts from zero to 15. If for some reason the component drifts or a combination of component drift and temperature effects cause the signal on lead 52 to deviate from its desired range so much that even when counter 205 has reached its maximum count the signal on lead 52 is not within 75 millivolts of ground, count 15 decoder 245 sets memory 240 to inhibit any further clock pulses from reaching counter 205. If this were not done, counter 205 would continue cycling all during the transmission.

Figure 3:
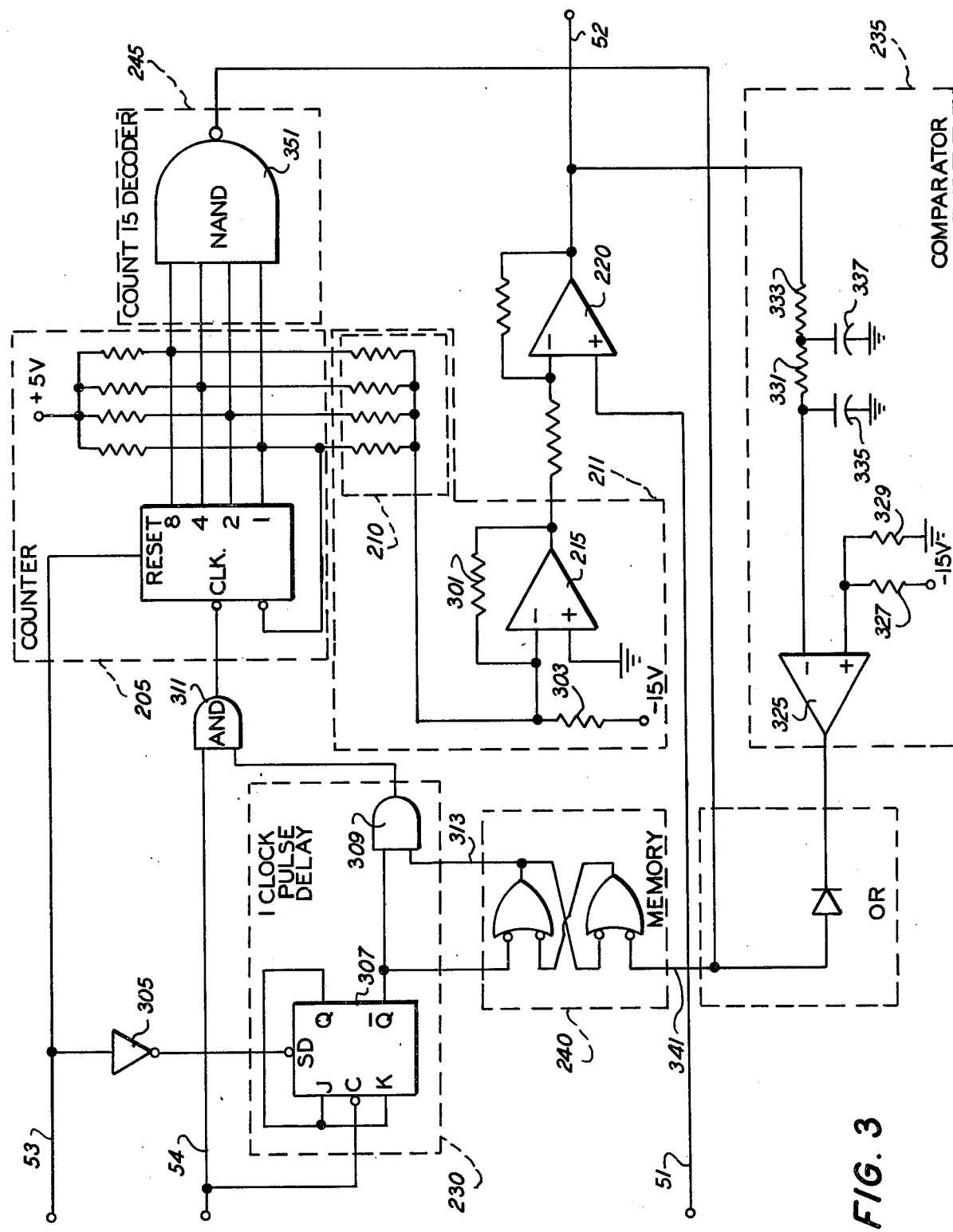
FIG. 3 is a detailed schematic diagram of the circuit whose block diagram is depicted in FIG. 2 and which operates in accordance with the principles of this invention.

Turning now to FIG. 3, depicted therein is a detailed schematic diagram of an illustrative circuit whose block diagram is depicted in FIG. 2. The dotted lines around portions of the FIG. 3 circuitry correspond to the blocks in FIG. 2 and have been given the same reference numerals.

Since there are a possible 15 incrementing steps, each step being 150 millivolts, the total adjustment range of the signal on lead 52 is 2.25 volts. In order to provide maximum adjustability, the initial bias to amplifier 220 from amplifier 215 when counter 205 is reset and when the signal on line 51 is +5.3 volts, is chosen so that the signal on line 52 is at −1.1 volts, approximately half the adjustment range. This is accomplished by the −15 volt supply coupled to the inverting input terminal of amplifier 215. This −15 volts is multiplied by the ratio of resistors 301 and 303 which are chosen to give an output of +8.26 volts from amplifier 215. The other source of bias voltage to amplifier 220 is from binary weighted resistor network 210. Counter 205 is a 4-bit binary ripple counter, such as a type 7493. The resistor values in binary weighted resistor network 210 are chosen so that as counter 205 increments, incremental voltages are applied to the inverting input terminal of amplifier 215, thereby decreasing the output of amplifier 215, since amplifier 215 is an inverting amplifier, and consequently increasing the signal on lead 52 in 150 millivolt steps.

Before the carrier signal is detected, the signal on lead 53 is at a logical ONE level thereby, resetting counter 205. The appearance of a high logic level signal on lead 53 causes the output of inverter 305 to drop to a low logic level which sets flip flop 307. Flip flop 307 is a JK type flip flop with a direct set input. With the direct set input of flip flop 307 held at ZERO, clock pulses on lead 54 cannot change the state of flip flop 307. With flip flop 307 set, a ZERO on the Q output of flip flop 307 puts a ZERO on one input of AND gate 309 which, in turn, ensures that there is a low logic level signal on one input of AND gate 311, thereby inhibiting the output of AND gate 311 fron changing state due to the clock pulses on lead 54. This prevents clock pulses from incrementing counter 205.

When a carrier signal is detected, the signal on lead 53 goes to ZERO, enabling counter 205. Counter 205 can increment as soon as it receives clock pulses. The changing level of the signal on lead 53 also removes the set input from flip flop 307. The first negative transition of a clock pulse on lead 54 after the signal on lead 53 goes to ZERO causes flip flop 307 to change state. The Q output of flip flop 307 goes to ZERO and the Q̄ output of flip flop 307 goes to ONE. When the Q output of flip flop 307 goes to ZERO, it causes the J and K inputs of flip flop 307 to also go to ZERO, and under these conditions further clock pulses on line 54 into flip flop 307 will not allow it to change state. But the Q̄ output of flip flop 307 is now at a ONE level. Memory 240 comprises a pair of cross coupled NAND gates connected as a flip flop. When the Q output of flip flop 307 was ZERO, this set memory 240 and caused its output on lead 313 to be at a ONE level. When flip flop 307 changed state, its Q̄ output went to a ONE, but this did not change the state of flip flop 240. With the Q̄ output of flip flop 307 at a ONE, both inputs to AND gate 309 are at ONE. Therefore, the output of AND gate 309 to AND gate 311 is a ONE. This enables AND gate 311 and clock pulses on lead 54 are allowed to pass through AND gate 311 to be applied to counter 205. For every negative transition of the clock pulses on lead 54, counter 205 will increment by one the clock pulses on lead 54, counter 205 will increment by one bit.

As the clock pulses on lead 54 increment counter 205, the output of counter 205 coupled through the four resistors making up binary weighted resistor network 210 causes the voltage at the output of amplifier 215 to decrease. As previously explained, this is because the nominal voltage at the output of amplifier 215 is preset by an input to its inverting input terminal from the −15 volt supply. Since amplifier 215 is inverting, its output is positive. As counter 205 increments, steps of positive voltage are applied to the inverting input terminal of amplifier 215 through binary weighted resistor network 210. This causes the output of amplifier 215 to decrease, thereby increasing the output of amplifier 220.

The overall function of the inventive circuit is to adjust the signal on lead 52 to be in the range of 0 ± 75 millivolts. Therefore, comparator 235 is coupled to lead 52. Comparator 235 comprises difference amplifier 325 having its noninverting input biased at −75 millivolts. This is accomplished from the −15 volt source connected to the resistor divider network comprising resistors 327 and 329. The signal on lead 52 is coupled to the inverting input of amplifier 325 through the low pass filter comprising resistors 331 and 333 and capacitors 335 and 337. The purpose of this filter is to remove any AC ripple. The output of amplifier 325 is normally at a ONE level when the signal on lead 52 is below, or more negative than, −75 millivolts. When the signal on lead 52 becomes greater than −75 millivolts, the output of amplifier 325 changes to a ZERO. A ZERO at the output of amplifier 325 places a ZERO on lead 341 which resets the flip flop in memory 240, placing a ZERO on lead 313. This disables AND gate 309 which in turn disables AND gate 311, preventing further clock pulses on lead 54 from reaching and incrementing counter 205. Counter 205 maintains its present state, thereby keeping the signal on lead 52 within the prescribed range for the signal on line 51 corresponding to a detected signal at the carrier frequency.

There is an alternate way of stopping the incrementing of counter 205. When counter 205 reaches its maximum count, all the inputs to NAND gate 351 in count 15 decoder 245 are at a ONE level. This places a ZERO on lead 341, resetting memory flip flop 240 and inhibiting further clock pulses from reaching counter 205, as previously described in conjunction with the description of the operation of comparator 235. Therefore, if by the time counter 205 has reached its maximum count, the signal on lead 52 is still not within the range of 0 ± 75 millivolts, the counter is stopped to prevent it from cycling back to zero and counting again all through the transmission period.

Accordingly, there has been shown an illustrative arrangement for use in a data communications system to provide automatic compensation for component value drifting. It is understood that the above-described arrangement is merely illustrative of the application of the principles of this invention. Numerous other arrangements may be devised by those skilled in the art without departing from the spirit and scope of this invention. While the above-described arrangement has been shown as being utilized in a facsimile system, it is understood that this is not intended to be limiting and that the principles of this invention may be utilized in any other suitable environment.

What is claimed is:

1. A drift compensated signal level shifter comprising the combination of
   a difference amplifier having a pair of inputs and an output;
   means for applying an input signal to one of the inputs of said amplifier, said input signal having a predetermined initial set point voltage level;
   a controllable voltage source for applying a level shifting voltage to the other input of said amplifier to thereby produce a level shifted version of said input signal at the output of said amplifier, said level shifting voltage having a predetermined initial level;
   a comparator coupled to the output of said amplifier for supplying an error signal having a first logic level whenever said level shifted signal deviates in one direction from a predetermined reference voltage and a second logic level whenever said level shifted signal deviates in the other direction from said reference voltage; and
   control means coupled between said comparator and said voltage source, said control means being allotted a predetermined period of time for incrementally adjusting the level of said level shifting voltage whenever said error signal is at said first logic level during said period of time, whereby compensation is provided for any drift in a first direction of said input signal from said set point voltage level.

2. The signal level shifter of claim 1 wherein said controllable voltage source comprises
   counter means for incrementally accumulating a count, and
   digital to analog converter means coupled between said counter means and said other input of said difference amplifier, said converter means adjusting said level shifting voltage in discrete voltage increments as said counter means accumulates said count.

3. The signal level shifter of claim 2 wherein said digital to analog converter means comprises
   a fixed voltage source for setting the initial level of said level shifting voltage,
   binary weighted resistor network means coupled to said counter means for adjusting a drift compensating voltage in discrete voltage increments as said counter means accumulates said count, and
   means for summing the voltage from said fixed voltage source with the voltage from said binary weighted resistor network means to apply a drift compensated level shifting voltage to said other input of said amplifier.

4. The signal level shifter of claim 2 wherein said control means includes
   a source of incrementing pulses for said counter means,
   gate means for coupling said incrementing pulses to said counter means, and
   means for enabling said gate means to pass said incrementing pulses to said counter means when said error signal is at said first logic level and for disabling said gate means when said error signal is at said second logic level.

5. The signal level shifter of claim 2 further comprising decoder means responsive to said counter means accumulating a predetermined count for generating a disabling signal, said control means including means for inhibiting further incrementing of said counter means in response to said disabling signal.

6. In a communications system with a receiving terminal for responding to an input signal having a predetermined carrier frequency and including an unmodulated portion followed by an information modulated portion; said receiving terminal including a carrier detector for responding to said input signal to provide a detect signal having a first logic level in the presence of said input signal and a second logic level in the absence of said input signal, and a demodulator for providing a demodulated signal in response to said input signal; the improvement comprising a drift compensated signal level shifter in said receiving terminal for shifting the voltage level of said demodulated signal; said signal level shifter including
   a difference amplifier having a pair of inputs and an output,
   means for applying said demodulated signal to one of the inputs of said amplifier,
   a controllable voltage source for applying a level shifting voltage to the other input of said amplifier, whereby a level shifted version of said demodulated signal appears at the output of said amplifier,
   a comparator coupled to the output of said amplifier for comparing said level shifted signal against a reference voltage to provide an error signal having a first logic level whenever said level shifted signal deviates in one direction from said reference voltage and a second logic level whenever said level shifted voltage deviates in the opposite direction from said reference voltage, said reference voltage being selected to define one end of a permissible range for said level shifted signal when said input signal is at said carrier frequency, and control means coupled between said comparator and said voltage source for incrementally adjusting said level shifting voltage when said error signal is at said first logic level, while said input signal is at said carrier frequency, and in a manner tending to bring said level shifted signal within said range.

7. The improvement of claim 6 wherein said controllable voltage source includes means for supplying a fixed voltage, a counter for accumulating a count in response to clock pulses, means for resetting said counter whenever said detect signal goes to said second logic level, whereby said counter is cleared in the absence of said input signal, a binary weighted resistive network for converting the count accumulated by said counter into a compensating voltage, and means for summing said fixed voltage and said compensating voltage to provide said level shifting voltage.

8. The improvement of claim 7 wherein said control means includes a source of clock pulses, gate means coupling between said clock pulse source and said counter, and means for enabling said gate means to pass said clock pulses to said counter when said error signal is at said first logic level and for disabling said gate means when said error signal is at said second logic level.

9. The improvement of claim 8 wherein said control means further includes decoder means responsive to said counter accumulating a predetermined count for applying a disabling signal to said gate means, thereby preventing further clock pulses from passing to said counter.

* * * * *